US009671832B2

(12) United States Patent
Zhao et al.

(10) Patent No.: US 9,671,832 B2
(45) Date of Patent: Jun. 6, 2017

(54) AUTOMATICALLY CHANGING ARRANGEMENT OF SOFT-OPERATION INTERFACE BASED ON DETECTION BY GRAVITY SENSOR

(71) Applicants: Xiangyang Zhao, Qingdao (CN); Wenhao Yu, Qingdao (CN); Wanhui Zhou, Qingdao (CN); Fanghao Gong, Qingdao (CN); Tongli Wan, Qingdao (CN)

(72) Inventors: Xiangyang Zhao, Qingdao (CN); Wenhao Yu, Qingdao (CN); Wanhui Zhou, Qingdao (CN); Fanghao Gong, Qingdao (CN); Tongli Wan, Qingdao (CN)

(73) Assignees: QINGDAO HAIER ELECTRONICS CO., LTD., Qingdao (CN); HAIER GROUP CORPORATION, Qingdao (CN)

( * ) Notice: Subject to any disclaimer, the term of this patent is extended or adjusted under 35 U.S.C. 154(b) by 0 days.

(21) Appl. No.: 14/208,228

(22) Filed: Mar. 13, 2014

(65) Prior Publication Data
US 2014/0267057 A1 Sep. 18, 2014

(30) Foreign Application Priority Data
Mar. 15, 2013 (CN) .......................... 2013 1 0085127

(51) Int. Cl.
*G06F 1/16* (2006.01)
(52) U.S. Cl.
CPC .................. *G06F 1/1694* (2013.01)

(58) Field of Classification Search
CPC ............... G06F 3/0488; G06F 3/04886; G06F 2200/1614; G06F 1/1694; G06F 3/0489; G06K 15/02; H01H 9/181; H03K 17/969; H04M 2250/70
USPC ........................................ 715/773, 788, 799
See application file for complete search history.

(56) References Cited

U.S. PATENT DOCUMENTS

| | | | |
|---|---|---|---|
| 6,789,967 B1 * | 9/2004 | Forester ................ | G06F 3/0202 400/485 |
| 7,978,176 B2 * | 7/2011 | Forstall et al. ............... | 345/158 |
| 8,625,020 B2 * | 1/2014 | Cheong et al. .......... | 348/333.06 |
| 2011/0090151 A1 * | 4/2011 | Huang .................. | G06F 3/0237 345/168 |
| 2012/0162078 A1 * | 6/2012 | Ferren ................. | G06F 3/04886 345/168 |
| 2013/0002562 A1 * | 1/2013 | Leskela ............... | G06F 3/04886 345/169 |
| 2013/0035139 A1 * | 2/2013 | Sheynblat ........... | H04M 1/0281 455/566 |

(Continued)

*Primary Examiner* — Ryan A Lubit
(74) *Attorney, Agent, or Firm* — Troutman Sanders

(57) ABSTRACT

The present invention relates to a smart equipment and the display control method of the soft-operation interface thereof, wherein the display controlling method of the soft-operation interface of the smart equipment comprising: sensing the action changing information of the smart equipment by the gravity sensor; according to the action changing information, adjusting the soft-operation interface arrangement of the smart equipment on its display screen. By using the present invention, it is convenient for users to carry out one-hand operation on the smart equipment, and the convenience for the users is improved.

15 Claims, 5 Drawing Sheets

(56) References Cited

U.S. PATENT DOCUMENTS

2013/0286573 A1* 10/2013 Adams .................. G06F 1/1694
　　　　　　　　　　　　　　　　　　　　　　361/679.2
2013/0328935 A1* 12/2013 Tu ......................... G06F 1/1694
　　　　　　　　　　　　　　　　　　　　　　345/651
2015/0116363 A1*  4/2015 Monte .................... G06T 3/60
　　　　　　　　　　　　　　　　　　　　　　345/659

* cited by examiner

| 1 | 2 | 3 |
|---|---|---|
| 4 | 5 | 6 |
| 7 | 8 | 9 |

Fig 3A

| 3 | 2 | 1 |
|---|---|---|
| 6 | 5 | 4 |
| 9 | 8 | 7 |

Fig 3B

| 9 | 6 | 3 |
|---|---|---|
| 8 | 5 | 2 |
| 7 | 4 | 1 |

Fig 3C

AUTOMATICALLY CHANGING ARRANGEMENT OF SOFT-OPERATION INTERFACE BASED ON DETECTION BY GRAVITY SENSOR

TECHNICAL FIELD

The present invention relates to the field of smart equipment technologies, in particular to a smart equipment and a display control method of the soft-operation interface thereof.

BACKGROUND OF THE INVENTION

With the development of the communication technology, the display applications of the smart equipment updates constantly, such as video, animation games, mobile reading, securities market, etc. Large screen has almost become a necessary configuration for the smart equipment, such as a smart phone.

However, with the size of screen becomes bigger and bigger, some usage problems occur accordingly. For example, the soft keyboard dialing, which can be completed by one hand on a conventional mobile phone, has to be completed by the cooperation of two hands on a large screen smart phone, thus causing great inconvenience for users.

SUMMARY

The brief description of the present invention is given below to provide basic understanding of some aspects of the present invention. It should be understood that, this description is not exhaustive type overview. It is not intended to define the key or important part of the invention, and it is also not intended to limit the scope of the invention. The purpose is only to present some concepts in a simplified form as the preamble of the later discussed description in more detail.

The present invention provides an smart equipment and display control method of the soft-operation interface thereof to improve the convenience for users.

In one aspect, the present invention provides a display control method of the soft-operation interface of the smart equipment, which includes:

sensing the action changing information of the smart equipment by using the gravity sensor;

according to the action changing information, adjusting the soft-operation interface arrangement of the smart equipment on its display screen.

In another aspect, the present invention also provides an smart equipment, which includes:

Gravity sensor, for sensing the action changing information of the smart equipment;

Arrangement adjusting module, connecting with the gravity sensor, for adjusting the soft-operation interface arrangement of the smart equipment on its display screen according to the action changing information.

Using the technical solution provided by the present invention, the soft-operation interface arrangement on the display screen of the smart equipment can be adjusted self-adaptively according to the action changing information of the smart equipment itself, thus it is convenient for users to carry out one-hand operation on the soft-operation interface of the smart equipment, and the convenience for the users is improved

BRIEF DESCRIPTION OF THE DRAWINGS

In order to describe the embodiments of the present invention or the technical solution of the prior art more clearly, the drawings required to be used in the embodiments or the prior art will be briefly presented below. It is obvious for one skilled in the art that the drawings described below are only some embodiments of the present invention, and other drawings also can be achieved based on these drawings without exerting creative work.

FIG. 3A is an alternative example of the first display state of the soft-operation interface arrangement of the smart equipment provided by the embodiment of the present invention;

FIG. 3B is an alternative example of the second display state of the soft-operation interface arrangement of the smart equipment provided by the embodiment of the present invention, wherein the second display state is the mirror of the first display state;

FIG. 3C is an alternative example of the second display state of the soft-operation interface arrangement of the smart equipment provided by the embodiment of the present invention, wherein the second display state is the transposition of the first display state;

DETAILED DESCRIPTION OF PREFERRED EMBODIMENTS

In order to make the objectives, technical solutions and advantages of the present invention clearer, the present invention is hereinafter described in detail with reference to the accompanying drawings and embodiments. It should be noted that the described embodiments are only a part of embodiments of the present invention, rather than all of the embodiments. Elements and characteristics described in one drawing or embodiment in the invention can be combined with one or more elements and characteristics showed in other drawings or embodiments. It should be noted that, for the purpose of clarity, the drawings and explanations omit the representations and descriptions of the components and process irrelevant to the present invention or well known by one skilled in the art. Based on the embodiments of the invention, all the other embodiments obtained by one skilled in the art without exerting creative work will all fall in the protection scope of the present invention.

Figure 1:
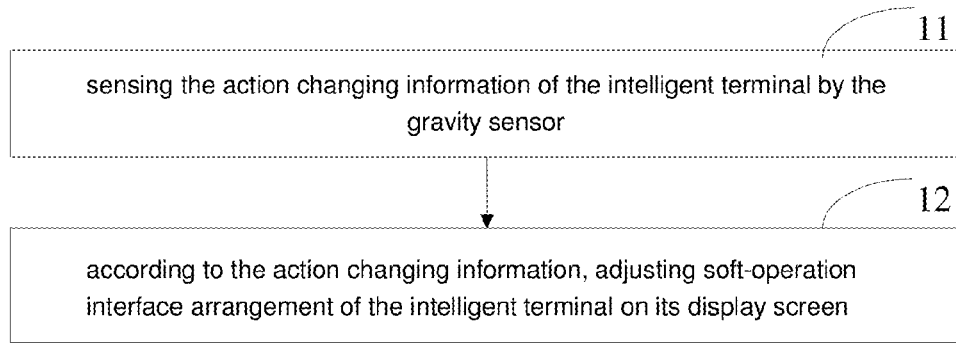
FIG. 1 is a flow chart of the display control method of the soft-operation interface of the smart equipment provided by the first embodiment of the present invention.

FIG. 1 is a flow chart of the display control method of the soft-operation interface of the smart equipment provided by the first embodiment of the present invention. As shown in FIG. 1, the display control method of the soft-operation interface of the smart equipment provided by the embodiment of the present invention includes:

step 11: sensing the action changing information of the smart equipment by the gravity sensor;

step 12: according to the action changing information, adjusting the soft-operation interface arrangement of the smart equipment on its display screen.

The action changing information can include but not limit to: the current variation of the smart equipment in the current state relative to that in the preset reference state. Soft-operation interface is the presentation of multiple widgets in certain arrangement formed on the display screen through running software by the smart equipment, for example, the soft-operation interface can include but not limit to soft dialing keyboard or soft input keyboard, etc.

The technical solution provided by the present embodiment can self-adaptively adjust the soft-operation interface arrangement on the display screen of the smart equipment according to the action changing information of the smart equipment itself, thus it is convenient for users to carry out one-hand operation on the soft-operation interface of the smart equipment, and the convenience for the users is improved.

In the above technical solution, the smart equipment can be but not limit to a handheld smart equipment, such as smart phone, Personal Access Device (PAD), etc. Considering the usage habits of the users using the handheld smart equipment such as a smart phone, it is alternative that the action changing information may specifically be the current tilt angle variation of the smart equipment in the current state relative to that in the preset reference state. Wherein, the tilt angle variation can include but not limit to the information of the smart equipment in the current state relative to that in the preset reference state, such as tilt direction and tilt degree, etc. Such process enables users use one-hand (left or right hand) to change the tilt angle of the handheld smart equipment to a certain direction, thus the smart equipment can self-adaptively adjust the soft-operation interface arrangement on the display screen of the smart equipment, and it is convenient for users to carry out one-hand (left or right hand) operation on the soft-operation interface of the smart equipment, and the convenience for the users is improved.

Figure 2:
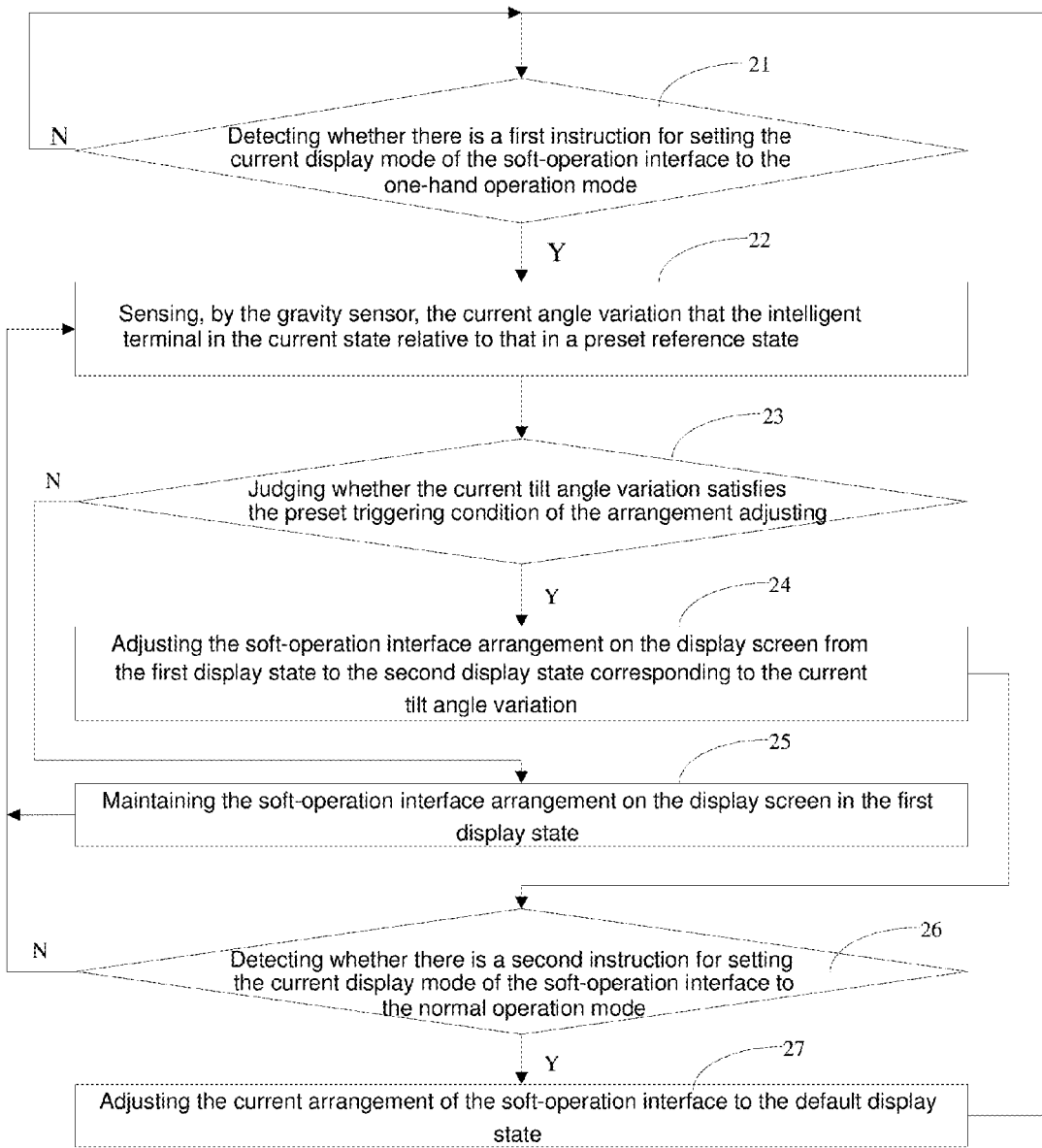
FIG. 2 is a flow chart of the display control method of the soft-operation interface of the smart equipment provided by the second embodiment of the present invention.

FIG. 2 is a flow chart of display control method of the soft-operation interface of the smart equipment provided by the second embodiment of the present invention. As shown in FIG. 2, the display control method of the soft-operation interface of the smart equipment provided by the present embodiment includes:

step 21: detecting whether there is a first instruction for setting the current display mode of the soft-operation interface to one-hand operation mode, if yes, performing step 22, otherwise, continuing to perform step 21;

step 22: sensing, by the gravity sensor, the current tile angle variation of the smart equipment in the current state relative to that in the preset reference state;

step 23: judging whether the current tilt angle variation satisfies the preset triggering condition of the arrangement adjusting, if yes, performing step 24, otherwise, performing step 25;

step 24: adjusting the soft-operation interface arrangement on the display screen from the first display state to the second display state corresponding to the current tilt angle variation, and performing step 26;

step 25: maintaining the soft-operation interface arrangement on the display screen in the first display state, and performing step 22;

step 26: detecting whether there is a second instruction for setting the current display mode of the soft-operation interface to the normal operation mode, if yes, performing step 27; otherwise, performing step 22;

step 27: adjusting the current arrangement of the soft-operation interface to the default display state and performing step 21.

The default display state of the soft-operation arrangement can be preset, for example, a common arrangement display state of the soft-operation interface can be set as the default display state, or, a user-defined display state of the soft-operation interface according to the user habits can be set as the default display state, the present invention do not limit it thereto.

The technical solution provided by the present embodiment provides convenience for users to switch the display modes of the soft-operation interface flexibly, thus to satisfy the diversity practical application requirements of different users. In addition, under the one-hand operation mode, the soft-operation interface arrangement on the display screen of the smart equipment also can be self-adaptively adjusted according to the tilt angle variation of the smart equipment, thus it is convenient to achieve one-hand operation for the users to operate the soft-operation interface of the smart equipment, and the convenience and flexibility of users are improved.

In the technical solution above, the second display state is the deformation state of the first display state of the soft-operation interface with the same content, for example, as to the soft-operation interface in the second display state, relative to the soft-operation interface in the first display state, the positions of at least part of the widgets on the display screen take the mirror or transposition adjustments. The fault display state can be any one of the said display states above. One alternative implementation method is, for example, the soft-operation interface can include but not limit to soft dialing keyboard or soft input keyboard; the first display state of the soft dialing keyboard or the soft input keyboard can be the default display state of the soft dialing keyboard or the soft input keyboard, and the second display state is the deformation of the first display state. When adjusting the soft control interface arrangement, the positions of at least part of the widgets of the soft-operation interface on the display screen take the mirror or transposition adjustments; and/or, the soft-operation interface is zoomed out and arranged close to the tilt side of the smart equipment.

Figure 3D:
FIG. 3D is another alternative example of the first display state of the soft-operation interface arrangement of the smart equipment provided by the embodiment of the present invention.
Figure 3E:
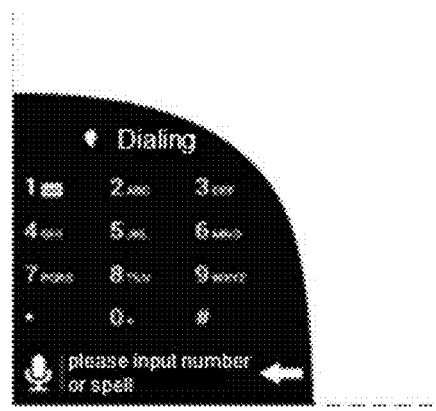
FIG. 3E is an alternative example of the second display state of the soft-operation interface arrangement of the smart equipment provided by the embodiment of the present invention, wherein the interface of the smart equipment zooms out, deforms and moves to the bottom left of the smart equipment.
Figure 3F:
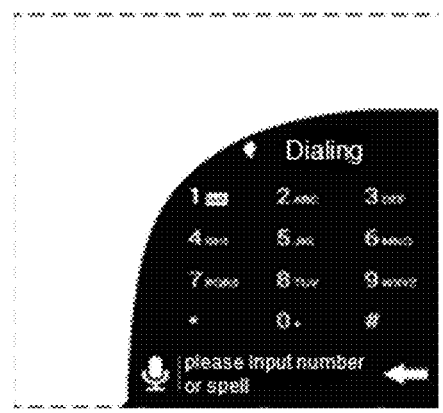
FIG. 3F is an alternative example of the second display state of the soft-operation interface arrangement of the smart equipment provided by the embodiment of the present invention, wherein the interface of the smart equipment zooms out, deforms and moves to the bottom right of the smart equipment.

One alternative application scene is, for example, when the current display mode of the soft-operation interface of the smart equipment is in the one-hand operation mode, user holds the smart equipment to tilt it for a certain angle, the soft dialing keyboard displayed on the display screen of the smart equipment is then adjusted from the current first display state (the alternative example is shown as FIG. 3A or FIG. 3D) to the second display state (alternatively, FIG. 3B as the mirror of FIG. 3A, or alternatively FIG. 3C as the transposition of FIG. 3A, alternatively FIG. 3E as the exemplary interface of FIG. 3D after being zoomed out, transformed and moved to the bottom left of the smart equipment, and alternatively FIG. 3F as the exemplary interface of FIG. 3D after being zoomed out, transformed and moved to the bottom right of the smart equipment) to adjust the widgets far away from the user's grasping part of the original dialing keyboard to the position close to the user's grasping part on the display screen, thus the user can easily use one hand to operate these widgets, and the practical application requirements, such as one-hand dialing, one-hand inputting, can be satisfied, and the convenience for the users is improved.

On the basis of the technical solution said above, it is alternative that, the display control method of the soft-operation interface of the smart equipment also includes: establishing and storing the mapping relation between the variation of the smart equipment and the display state of arrangement; setting the triggering condition of arrangement adjusting according to the mapping relation. One alternative implementing method is, for example, the users can set the smart equipment toward which direction and for what degree of the tilt angle to trigger the smart equipment to adjust the soft-operation interface arrangement on its display screen according to their own habits, and the smart equipment set the triggering condition of the arrangement adjusting according to the information above. The solution enables the customization of the triggering condition of the soft-operation interface arrangement, the diversity practical application requirements of different users can be better satisfied, and the convenience of users is further improved.

Figure 4:
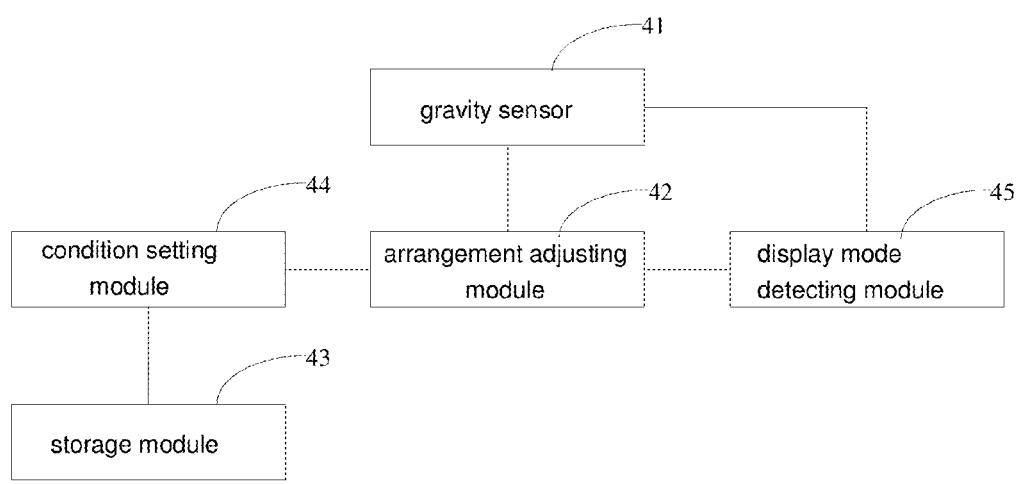
FIG. 4 is a principle block diagram of the smart equipment provided by the third embodiment of the present invention.

FIG. 4 is the principle block diagram of the smart equipment provided by the third embodiment of the present invention. As shown in FIG. 4, the smart equipment provided by the present embodiment includes: the gravity sensor 41 and the arrangement adjusting module 42.

The gravity sensor 41 is used to sense the action changing information of the smart equipment.

The arrangement adjusting module 42 is connected with the gravity sensor 41 and is used to adjust the soft-operation interface arrangement of the smart equipment on its display screen according to the action changing information.

The smart equipment provided by the present embodiment can self-adaptively adjust the soft-operation interface arrangement of the smart equipment on the display screen according to its own action changing information, thus it is convenient that the user can operate the soft-operation interface of the smart equipment by one-hand, and the convenience for users is improved.

Alternatively, the action changing information can include but not limit to: the current tilt angle variation of the smart equipment in the current state relative to that in the preset reference state. The tilt angle variation can include but not limit to: the information of the smart equipment in the current state relative to that in the preset reference state, such as tilt direction and tilt angle etc. The soft-operation interface can include but not limit to the dialing keyboard or the soft input keyboard.

Alternatively, the arrangement adjusting module includes: an adjustment judging unit and arrangement adjusting unit. The adjustment judging unit is used to judge whether the current tilt angle variation satisfies the preset triggering condition of the arrangement adjusting. The arrangement adjusting unit is connected with the adjustment judging unit and is used to adjust the soft-operation interface arrangement on the display screen from the first display state to the second display state corresponding to the current tilt angle variation if the current tilt angle variation satisfies the preset triggering condition of the arrangement adjusting, otherwise, to maintain the soft-operation interface arrangement on the display screen in the first display state. Alternatively, when adjusting the soft-operation interface arrangement on the display screen from the first display state to the second display state corresponding to the current tilt angle variation, the arrangement adjusting unit is specifically used to carry out the mirror or transposition adjustment on the position of at least part of widgets of the soft-operation interface on the display screen; and/or, to zoom out the soft-operation interface and arrange it close to one side of the smart equipment. The solution can self-adaptively adjust, according to the tilt angle variation of the smart equipment, the soft-operation interface arrangement, thus it is convenient for the user to operate the soft-operation interface of the smart equipment by one hand (left or right hand), and the convenience and flexibility for users are improved.

Alternatively, the smart equipment also can include a storage module 43 and a condition setting module 44. The storage module 43 is used to establish and store the mapping relation between the variation of the smart equipment and the display state of the arrangement. The condition setting module 44 is connected with the storage module 43 and the arrangement adjusting module 42 respectively and is used to set the triggering condition of the arrangement adjusting according to the mapping relation. The solution enables the customization of the triggering condition of the soft-operation interface arrangement, the diversity practical application requirements of different users can be better satisfied, and the convenience of users is further improved.

Alternatively, the smart equipment also may include a display mode detecting module 45. The display mode detecting module 45 is connected with the arrangement adjusting module 42 and the gravity sensor 41 respectively and is used to detect whether there is a first instruction for setting the current display mode of the soft-operation interface as one-hand operation mode; accordingly, the gravity sensor 41 is specifically set to start working to sense the action changing information of the smart equipment if the first instruction is detected by the display mode detecting module, And/or the display mode detecting module 45 is connected with the arrangement adjusting module 42 and used to detect whether there is a second instruction for setting the current display mode of the soft-operation interface as the normal operation mode; accordingly, the arrangement adjusting module 42 also can be used to adjust the current arrangement of the soft-operation interface to the default display state if the display mode detecting module has detected the second instruction. By the solution, it is convenience for users to flexibly switch the display modes of the soft-operation interface, and the diversity practical application requirements of different users are easily satisfied.

The smart equipment provided by the embodiment of the present invention can be but not limit to the handheld smart equipment, such as the smart phone, PAD etc. The operation mechanism and the achievable technical effect of the smart equipment can refer to the corresponding record of the method embodiments above, and need not be repeated here.

In the above embodiments of the present invention, the serial numbers of the embodiments above are just for description and would not represent the merits. The descriptions of different embodiments are focused differently, and the portion in a certain embodiment which is not described in detail can refer to the related descriptions of other embodiments.

It should be understood for one skilled in the art that: all or part of the steps for implementing the above method embodiments can be realized by hardware related to program instructions, and the preceding program can be stored in a computer readable storage medium, and when executing the program, the steps of the above said method embodiments can be executed; and the preceding storage medium includes various mediums that can store program codes, such as Read-Only Memory (ROM), Random Access Memory (RAM), magnetic disc or compact disc, etc.

In the device and method embodiments of the present invention, it is obvious that the components and steps can be decomposed, combined and/or recombined after decomposition. These decomposition and/or recombination should be viewed as the equivalent solutions of the present invention. Meanwhile, in the description of the specific embodiments of the present invention above, the features described and/or shown in one embodiment can be used in one or more other embodiments in the same or similar form, be combined with the features in the other embodiments, or be substitute for the features in the other embodiments.

It should be addressed that the terms "include/comprise", when using them, refers to existence of feature, element, step or component, but not exclusion of the existence or annexation of one or more other feature, element, step or component.

Finally, it should be noted that, although the present invention and its advantages are described specifically in the above, it should be understood that various changes, substitutes and transformations can be made without exceeding the spirit and scope of the present invention defined by the appending claims. Furthermore, the scope of the present invention is not confined to the specific embodiments of the processes, devices, means, methods and steps described in the description. It is easily understood by one skilled in the art from the disclosure of the present invention, the present invention can use the processes, devices, means, methods or steps that are existing and are will be developed in the future, which executing the functions that essentially are the same as the corresponding embodiments described herein or as which obtaining the essentially same result. Therefore, the appending claims aim to include such processes, devices, means, methods or steps in their scopes.

What is claimed is:

1. A display control method of a soft-operation interface of a smart equipment, the soft-operation interface having soft input keys for the smart equipment, comprising the following steps:

receiving an instruction for setting the soft-operation interface to a one-hand operation mode, wherein the soft-operation interface in the one-hand operation mode has a first display state and a second display state in a display screen of the smart equipment, and the soft-operation interface transforms between the first display state and the second display state based on a motion of one hand holding the smart equipment;

displaying the soft-operation interface in the first display state after receiving the instruction for setting the soft-operation interface to the one-hand operation mode;

sensing an action changing information of the smart equipment by a gravity sensor after receiving the instruction for setting the soft-operation interface to the one-hand operation mode;

according to the action changing information, determining an adjustment of the soft-operation interface from the first display state to the second display state following the motion of the hand to move at least one widget shown in the soft-operation interface towards a position of the hand holding the smart equipment, wherein the adjustment results in at least one of the following: (1) the second display state is a mirror of the first display state over a vertical axis, (2) the second display state is a transposition of the first display state such that the second display state is a mirror of the first display state over a diagonal, and (3) the second display state decreases in size of the soft-operation interface and moves the soft-operation interface towards the position of the hand holding the smart equipment; and displaying the soft-operation interface in the second display state in the display screen of the smart equipment.

2. The display control method of claim 1, wherein the action changing information includes a current tilt angle variation of the smart equipment in a current state relative to that in a preset reference state.

3. The display control method of claim 2, wherein determining the adjustment of the soft-operation interface according to the action changing information includes:

judging whether the current tilt angle variation satisfies a preset triggering condition for triggering the adjustment;

and when yes, determining the adjustment of the soft-operation interface on the display screen from the first display state to the second display state corresponding to the current tilt angle variation, otherwise, maintaining the soft-operation interface on the display screen in the first display state.

4. The display control method of claim 3, further comprising:

establishing and storing a mapping relation between a variation of the smart equipment and the display states of the soft-operation interface; and setting the triggering condition for triggering the adjustment according to the mapping relation.

5. The display control method of the soft-operation interface of the smart equipment according to any one of claims 1-4, wherein the soft-operation interface includes a soft dialing keyboard or a soft input keyboard.

6. The display control method of claim 1, further comprising:

detecting whether there is a second instruction for setting a current display mode of the soft-operation interface as a normal operation mode; and when yes, adjusting the soft-operation interface to a default display state.

7. The display control method of claim 1, wherein the smart equipment is a handheld smart equipment.

8. A smart equipment, comprising:

a gravity sensor, for sensing an action changing information of the smart equipment; and a processor in connection with the gravity sensor, the processor configured to:

receive an instruction for setting the soft-operation interface to a one-hand operation mode, wherein the soft-operation interface in the one-hand operation mode has a first display state and a second display state in a display screen of the smart equipment, and the soft-operation interface transforms between the first display state and the second display state based on a motion of one hand holding the smart equipment;

display the soft-operation interface in the first display state after receiving the instruction for setting the soft-operation interface to the one-hand operation mode;

determine an adjustment of the soft-operation interface from the first display state to the second display state following the motion of the hand to move at least one widget shown in the soft-operation interface towards a position of the hand holding the smart equipment according to the action changing information, the soft-operation interface including soft input keys of the smart equipment, wherein the adjustment results in at least one of the following: (1) the second display state is a mirror of the first display state over a vertical axis, (2) the second display state is a transposition of the first display state such that the second display state is a mirror of the first display state over a diagonal, and (3) the second display state decreases in size of the soft-operation interface and moves the soft-operation interface towards the position of the hand holding the smart equipment.

9. The smart equipment of claim 8, wherein the action changing information includes a current tilt angle variation of the smart equipment in a current state relative to that in a preset reference state.

10. The smart equipment of claim 9, wherein the processor is configured to:
judge whether the current tilt angle variation satisfies a preset triggering condition for triggering the adjustment;
determine the adjustment of the soft-operation interface on the display screen from the first display state to the second display state corresponding to the current tilt angle variation when the current tilt angle variation satisfies a preset triggering condition for triggering the adjustment, otherwise, for maintaining the soft-operation interface on the display screen in the first display state.

11. The smart equipment of claim 10, further comprising:
a storage medium, for establishing and storing a mapping relation between a variation of the smart equipment and the display states of the soft-operation interface;
wherein the processor is configured to set the triggering condition for triggering the adjustment according to the mapping relation.

12. The smart equipment of claim 8, wherein the soft-operation interface includes soft dialing keyboard or soft input keyboard.

13. The smart equipment of claim 8,
wherein the gravity sensor is specifically set to start working to sense the action changing information of the smart equipment after the processor receives the instruction for setting the soft-operation interface to the one-hand operation mode.

14. The smart equipment of claim 8, wherein the processor is configured to:
detect whether there is a second instruction for setting a current display mode of the soft-operation interface as a normal operation mode; and
adjust the soft-operation interface to a default display state when the second instruction is detected.

15. The smart equipment of claim 8, wherein the smart equipment is a handheld smart equipment.

* * * * *